United States Patent [19]

House, II et al.

[11] Patent Number: 4,677,362

[45] Date of Patent: Jun. 30, 1987

[54] APPARATUS FOR STORING AND CHARGING A RECHARGEABLE ELECTRIC TOOL

[75] Inventors: Lawrence E. House, II; William H. O'Connor, both of Raleigh, N.C.

[73] Assignee: Black & Decker, Inc., Newark, Del.

[21] Appl. No.: 720,905

[22] Filed: Apr. 8, 1985

Related U.S. Application Data

[63] Continuation-in-part of Ser. No. 646,139, Aug. 31, 1984.

[51] Int. Cl.⁴ .................. A45F 5/02; H01M 45/04
[52] U.S. Cl. .................................. 320/2; 224/192; 224/195; 224/904
[58] Field of Search .................... 320/2; 362/183; 224/192–200, 226, 232, 234, 240, 241, 242, 246, 252, 253, 262, 269, 902, 904

[56] References Cited

U.S. PATENT DOCUMENTS

| | | | |
|---|---|---|---|
| 1,757,889 | 5/1930 | Wheat | 320/2 X |
| 3,520,241 | 7/1970 | Caldwell | 224/246 X |
| 3,684,941 | 8/1972 | Van Acker et al. | 320/2 |
| 3,924,097 | 12/1975 | Knowles et al. | 320/2 X |
| 4,113,156 | 9/1978 | Brito | 224/904 X |
| 4,214,688 | 7/1980 | Griffin, Jr. | 224/197 |
| 4,408,706 | 10/1983 | Hurley | 224/192 |
| 4,438,483 | 3/1984 | Gulliksen et al. | 362/183 |
| 4,485,946 | 12/1984 | Liautaud et al. | 224/197 X |

FOREIGN PATENT DOCUMENTS

| | | | |
|---|---|---|---|
| 983059 | 2/1951 | France | 362/183 |
| 290974 | 4/1929 | United Kingdom . | |
| 460677 | 2/1937 | United Kingdom . | |
| 604192 | 6/1948 | United Kingdom . | |
| 1075857 | 7/1967 | United Kingdom . | |

OTHER PUBLICATIONS

Black & Decker Power Tool Accessories Catalog, Form 369, 1984, Cover (back and front), and p. 32 showing Catalog Nos. 69600, Belt Clip, 69590, Holster and 98004, Holster.
Black and Decker Power Tools Catalog, Form No. 368, 1984, Cover (back and front), and p. 29 showing screwdrivers with belt clips, Catalog Nos. 2034-10 and 2032-10.
Makita Power Tools Catalog, 1982-A, publication date unknown, Cover and p. 36 showing drills with belt clips, Model Nos. 6500PB, DP3720 and 6510PB.
Black & Decker 1982-1983 Consumer Catalog, Form 353-6-1-82, showing, respectively, Model 9360, Spotlighter Rechargeable Light and Model No. 9330, Dustbuster Cordless Vac.
Black & Decker Household Products Catalog, 1984-1985, Form No. 370, 1984, Cover (back and front), and pp. 9 and 11 showing respectively, Model No. 9365, Rechargeable Security Light and Model 9366, Rechargeable Task Light.
Evans 1981-82 Catalog, p. 378, "Skil Cordless Drill", 1981.

*Primary Examiner*—R. J. Hickey
*Attorney, Agent, or Firm*—Finnegan, Henderson, Farabow, Garrett & Dunner

[57] ABSTRACT

An apparatus for storing and recharging a rechargeable electric tool such as an electric drill is disclosed. The apparatus includes a holster that receives a portion of the tool and facilitates it being detachably affixed to the clothing of the user. The holster further includes an opening exposing the electrical contacts used to recharge the tool. The apparatus further includes a base for recharging the tool. The base engages the holster and makes electrical contact with the electrical contacts on the tool through the opening in the holster.

28 Claims, 10 Drawing Figures

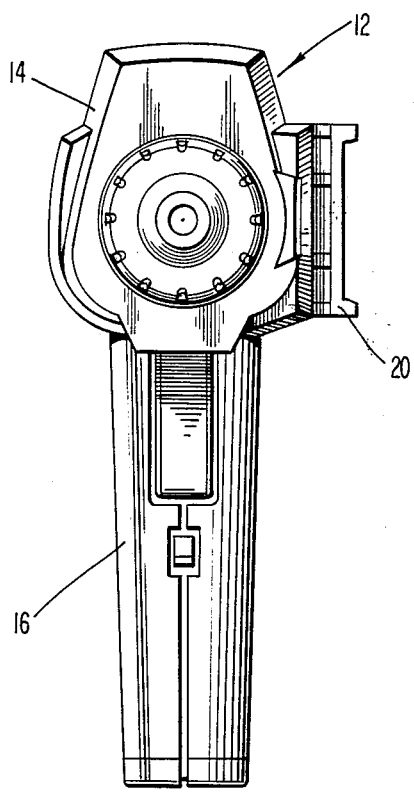
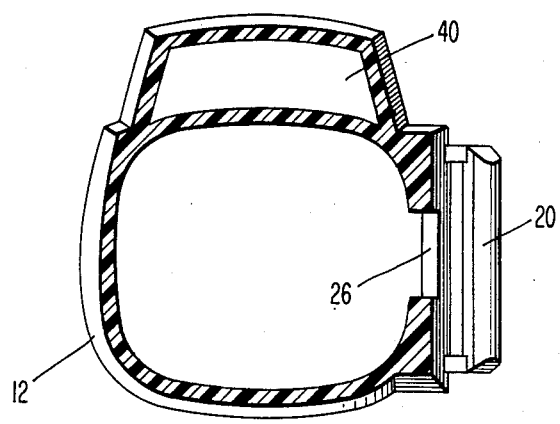
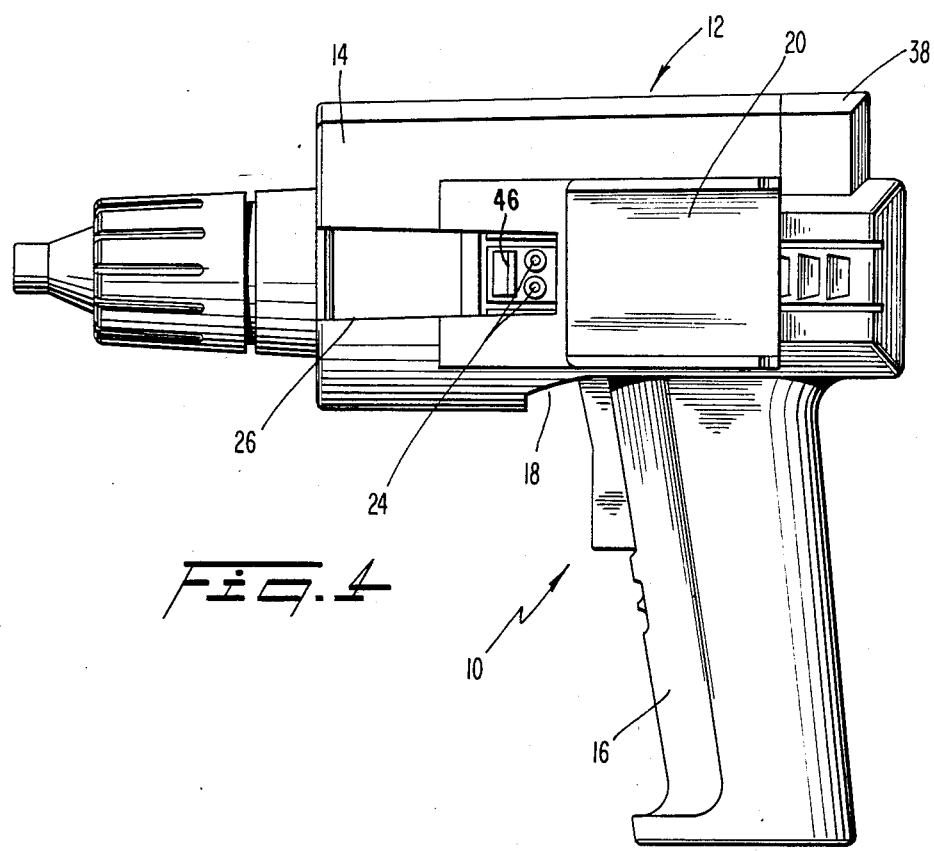

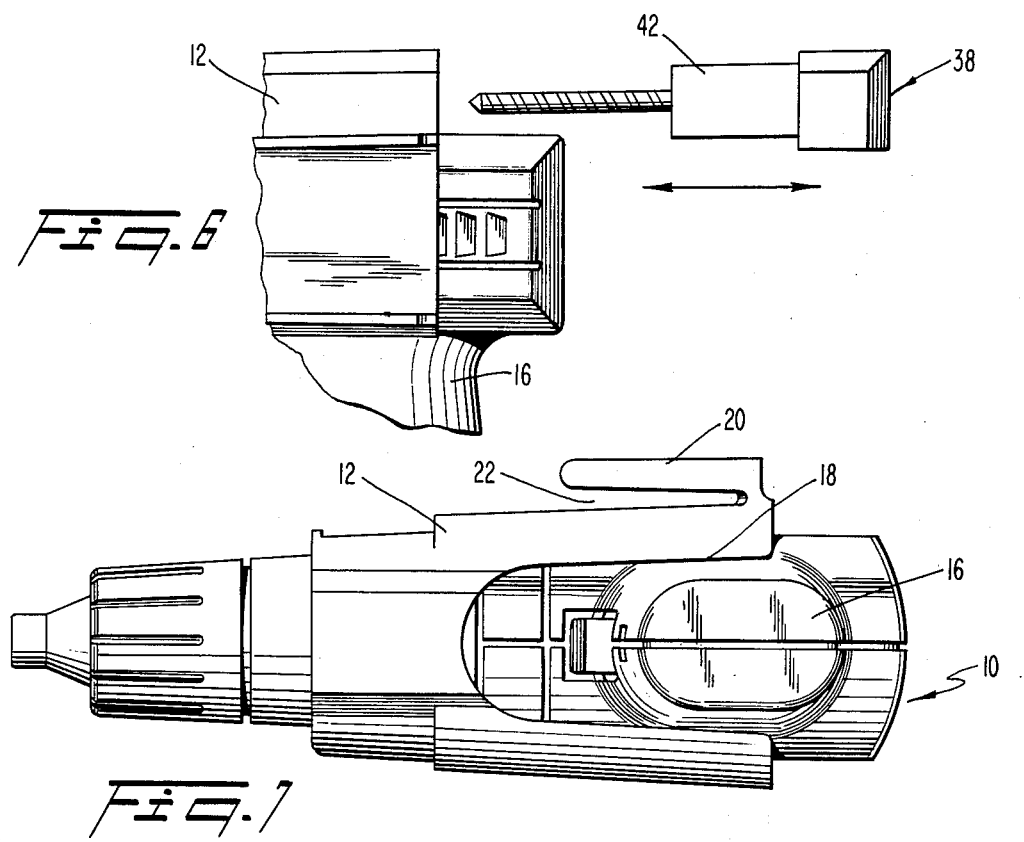
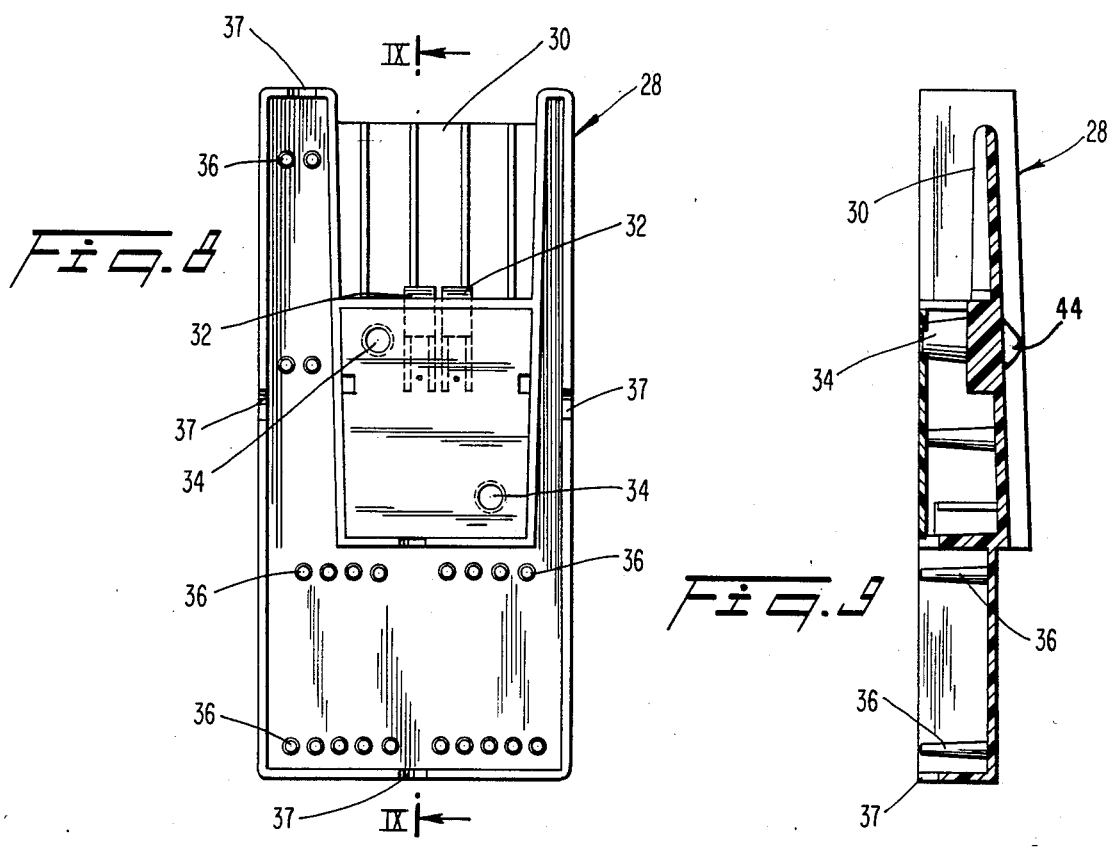

4,677,362

APPARATUS FOR STORING AND CHARGING A RECHARGEABLE ELECTRIC TOOL

DESCRIPTION OF RELATED APPLICATIONS

This application is a continuation-in-part of copending application Ser. No. 646,139, filed Aug. 31, 1984.

BACKGROUND OF THE INVENTION

The present invention relates to apparatus for storing and charging rechargeable electric tools.

The advent of high output rechargeable batteries has resulted in the development of a number of different electric tools that operated on battery power but are recharged from household current. Rechargeable electric vacuums, flashlights and even relatively low power electric power tools may be battery powered.

Conventionally such devices are stored in a recharging base that makes electrical contact with the batteries in the device and applies a D.C. current to recharge the batteries. The base ordinarily includes means for regulating the charge applied to the batteries as well as a transformer for converting the A.C. household current to the appropriate D.C. power input for the battery. Such recharging bases normally provide a recess in which the device is placed to insure that electrical contact is made. Conventionally, the tool simply rests in the recess and is neither covered nor affixed securely to the base.

Portable electric tools such as drills and the like, and especially rechargeable tools, are infrequently in continuous use. For example, a drill may be used to form a hole in which a fastener is placed or the article to be drilled may require fitting before the next hole is drilled. While the drill is not being used, it would be convenient to attach it on the clothing of the user rather than placing the tool down and picking it up again each time it is used. A number of tools have clips or the like that are intended to engage the clothing of the user. Such clips, however, have significant drawbacks. In order to engage such a clip onto, for example, a belt around the waist without using two hands, such a clip should project out from the side of the tool. Such a clip must also be large enough to securely retain the tool and, as a result, the dimensions of the tool will be significantly increased. This limits the usefulness of the tool in applications where clearance space is limited. While retractable clips or the like on the housing are feasible, they are relatively expensive to manufacture, prone to breakage, and normally difficult to actuate with one hand.

It is therefore the principal object of the present invention to provide an apparatus for storing and charging a rechargeable electric tool that is relatively inexpensive, does not increase the dimensions of the tool, and securely holds the tool in a convenient position on the clothing of the user such that the tool can be used more efficiently.

It is a further object of the present invention to provide an apparatus that securely locates the tool on the recharging base in such a manner that it is positively engaged with the base.

An additional object of the invention is to provide a means for storing the entire tool in a charging base without the risk that a portion of the tool, i.e. the holster, would be lost or damaged due to its being stored separately.

Other objects and advantages of the invention will become apparent from the description of the preferred embodiment or may be used from practice of the invention.

SUMMARY OF THE INVENTION

In order to achieve the objects and advantages of the present invention there is provided an apparatus for storing and charging a rechargeable electric tool having accessible electrical contact for charging the tool. The apparatus comprises a holster for the tool that includes a tool storage portion disposed to receive and retain the tool. The holster further includes means for detachably affixing the holster to the clothing of the user of the tool and means for exposing the electrical contacts on the tool. The apparatus further includes a recharging means having a base disposed to detachably engage the holster. The base includes means for electrically connecting the contacts on the electric tool through the contact exposing means of the holster.

Preferably, the electric tool is a drill having a motor containing a housing, electrical contacts on the housing for recharging the drill, and a handle projecting from the housing. In such a preferred embodiment, the holster for the drill has a portion disposed to receive and retain the housing of the drill with an opening in the retaining portion for exposing the contacts on the housing.

In an additional preferred embodiment the holster includes a means for storing drill bits. Preferably the drill bits storage means is detachably affixed to the holster.

BRIEF DESCRIPTION OF THE DRAWINGS

The accompanying drawings, which form a part of this specification, depict an embodiment of the present invention.

FIG. 3 is an end view of the embodiment of FIG. 2.

FIG. 4 is a left side view of a drill within the holster.

FIG. 5 is a cross-sectional view of the holster.

FIG. 6 is an exploded view depicting a means of storing drill bits in a device engaged into the holster.

FIG. 7 is an end view of the holster with the drill retained therein.

FIG. 8 is a rear view of the base of the recharging unit.

FIG. 9 is a cross-sectional view of the base along lines IX—IX.

A DESCRIPTION OF THE PREFERRED EMBODIMENT

The present invention will now be described in terms of a preferred embodiment.

Figure 1:
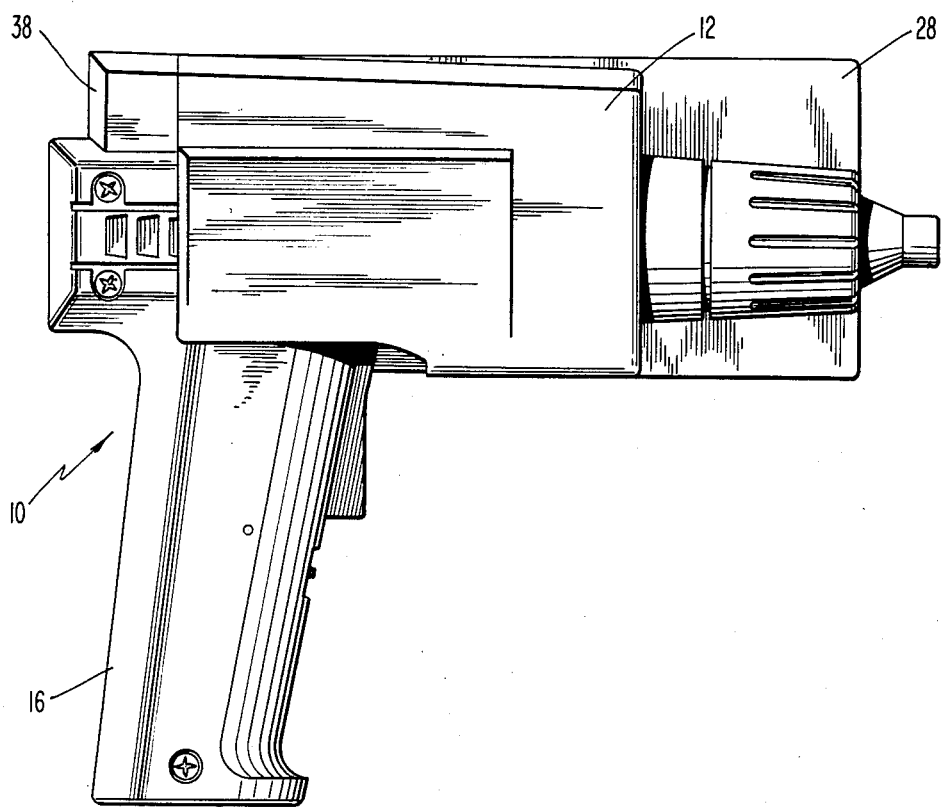
FIG. 1 is a top plan view of an embodiment of the invention where the rechargeable tool is a drill resting within a holster and a recharging base.
Figure 2:
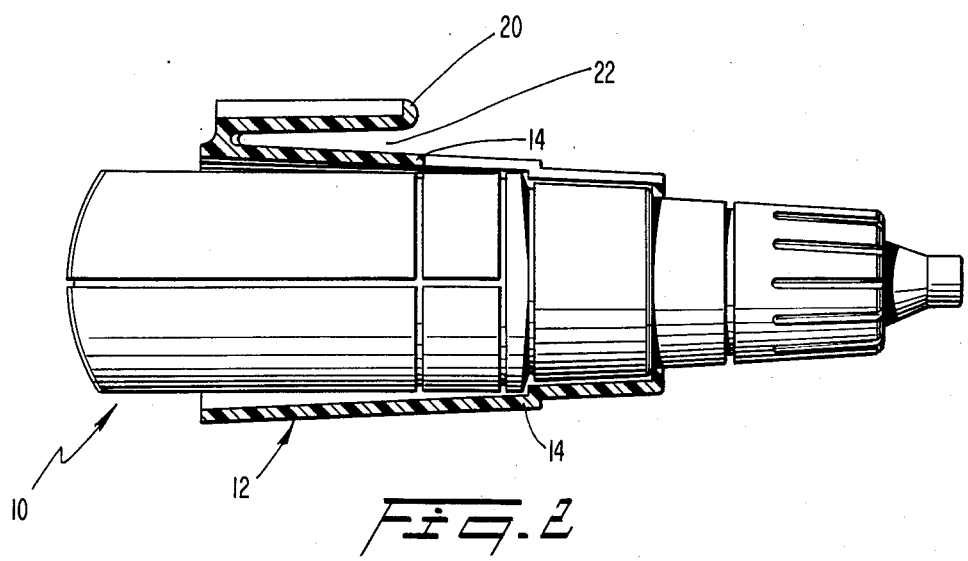
FIG. 2 is a partial cross-sectional view of the drill within the holster showing the belt clip and the opening giving access to the electrical contacts on the housing of the drill.

The invention comprises an apparatus for storing and charging a rechargeable electric tool. In the embodiment depicted, the tool is a rechargeable electric drill shown as the drill 10 in FIGS. 1 and 4. While the invention finds particular utility in storing and charging a rechargeable electric drill, other rechargeable electric tools may be used with the present invention. The invention's use with a drill, however, is particularly advantageous since a drill is generally used intermittently and may be used while standing on a ladder, where is it inconvenient to place the tool on a surface while another operation is being carried out between drilling operations. Even where placement of the tool at a convenient location is feasible, it is preferred that such a tool be readily accessible by being detachably affixed to the clothing of the user. The present invention facilitates such use of a tool by providing a holster-like device.

As here embodied and most clearly depicted in FIGS. 1 through 5, the tool includes a portion disposed to receive and retain the tool. As here embodied, the holster 12 includes a tool storing portion 14 that has an internal surface which complements the outer surface of the electric drill such that it is retained in the tool storing portion 14. The tool storing portion is, of course, adapted to the tool to be stored and locates the tool within the holster. As here embodied, the drill 10 has a projecting handle 16 which is accommodated in the holster 12 by means of a U-shaped handle opening 18. As is evident from FIGS. 2 and 5, drill 10 is readily removable from holster 12, since there are no projections or inter-connections between the drill and holster which interfere with free movement into and out of the holster.

In accordance with the invention, the apparatus further includes means for detachably affixing the holster to the clothing of the user of the tool. As here embodied and most clearly depicted in FIGS. 2 and 3, the holster 12 includes a U-shaped clip 20 having a downward-facing opening 22 that can be placed over the belt of the user of the tool. In such a manner the holster can be placed on the clothing of the user such that the tool or drill may be conveniently inserted and extracted from the holster when needed. As is evident from the embodiment of FIG. 3, the clip has a significant width across the holster thereby providing a stable and strong attachment of the holster to the clothing of the user. As is evident from the embodiment depicted in FIG. 2, the addition of a clip of such dimensions to the side of an electric drill would substantially increase its width and thereby limit the use of such a drill in situations where there is insufficient space to place the drill.

In accordance with the invention, the holster includes means for exposing electrical contacts on the tool. As here embodied and depicted in FIG. 4, the electric drill 10 includes two electrical contacts 24 on the side of the drill. These contacts are electrically connected to batteries within the rechargeable tool and facilitate the recharging of those batteries. As shown in FIG. 4, the side of the holster 12 includes an opening 26 that exposes the contacts 24 on the drill 10.

Figure 10:
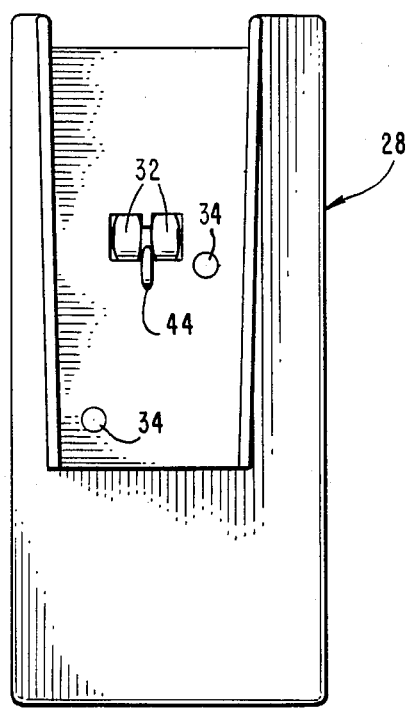
FIG. 10 a front view of the base of the recharging unit.

In accordance with the invention, the apparatus further includes recharging means for applying a recharging current to the batteries in the tool. Such recharging means normally have a transformer that is inserted into a wall receptacle, a two-conductor wire that is attached to the base and is electrically connected to the contacts of the rechargeable tool. As here embodied, the recharging means includes a base disposed to detachably engage the holster. As depicted in FIGS. 8, 9 and 10, base 28 includes projection 30 that is disposed to engage the opening 22 behind the clip 20 thereby affixing the holster 12 to the base 28. With the holster properly engaged to the base 28, the contacts 24 are aligned with contacts 30 on the base 28. These contacts are accessible in spite of the tool being within the holster 12 because of the opening 26 in the side of the holster. When the holster 12 is properly engaged to the base 28, the contacts 24 on the drill 10 are aligned with the contacts 32 on the base. As here embodied, the contacts 32 are sheet metal contacts riveted to a portion of the base 28.

In a preferred embodiment, the portion of drill 10 exposed through opening 26 of holster 12 includes a recess 46 adjacent contacts 24 as seen in FIG. 4. Additionally, as depicted in FIGS. 9 and 10, charger base 28 includes post 44 projecting outwardly from projection 30 proximate and between contacts 32 on base 28. By this preferred arrangement, when drill 10 in holster 12 is placed in base 28, post 44 engages recess 46 while clip 20 engages projection 30 thereby fixing drill 10 in the proper location relative to contacts 32 on base 28. Because of the flexibility of clip 20, drill 10 in holster 12 can move away from base 28 a sufficient distance to permit engagement and disengagement of post 44 and recess 46. The flexibility of clip 20 when engaging projection 30 and the engagement of post 44 with recess 46 in drill 10 stably locates the drill on charger base 28 for good electric contact during recharging. This important feature is achieved without structure which may interfere with removal of the drill from the holster when in use.

The cord and transformer of the recharging means are not depicted. However, the cord from the transformer is merely electrically connected to the two contacts 32 in such a manner that the contacts are provided with the proper recharging current.

As here embodied, the base 28 further includes means for attaching the base to a surface. As depicted in FIGS. 8 and 10, attachement holes 34 provides a means for placing fasteners through the base into the surface on which the base is to be mounted. The preferred embodiment for the base further includes pins 36 that project from the interior portion of the base that provide a cord wrap for storing lengths of the cord inside the base. The base may also include openings to allow the cord to exit the base 28 at a number of locations. Such openings are shown in FIG. 8 as the openings 37.

In a preferred embodiment, the holster includes means for storing drill bits. As here embodied and most clearly depicted in FIG. 6, the holster includes an elastomeric tool storage member 38. The storage member has a plurality of holes disposed to engage and retain tools such as screw driver bits or drill bits within the member 38. The member 38 is stored within the holster 12 by inserting it into the opening 40 depicted in FIG. 5. A plug-like portion 42 of the member 38 fits within the opening 40 in an interference fit thereby retaining the member 38 within the opening. Using such an embodiment, the operator of the drill has ready access to the various tools that can be inserted in the drill. They may be readily obtained by grasping the exposed portion of the member 38 and removing it from the holster thereby providing access to the tools stored therein.

The present invention has been disclosed in terms of a preferred embodiment; however, the invention is not limited thereto. The scope of the invention is determined by the appended claims and their equivalents.

What is claimed is:

1. An apparatus for storing and charging a rechargeable electric tool having accessible electrical contacts for recharging said tool, said apparatus comprising:
a holster for said tool, said holster including a tool storing portion disposed to receive and retain the tool in said portion, said holster further including means for detachably affixing said holster to the clothing of a user of the tool and means in said holster for exposing said electrical contacts on said tool; and recharging means having a base disposed to detachably engage said holster, said base including means for electrically connecting said contacts on said electric tool through the contact exposing means of said holster.

2. The apparatus of claim 1 wherein said electrically connecting means includes means cooperating through said contact exposing means for releasably fixing said tool to said base.

3. The apparatus of claim 2 wherein said fixing means comprises a recess on said tool proximate said electrical contacts and a post projecting from said base to releasably engage said recess through said contact exposing means.

4. An apparatus for storing and charging a rechargeable electric tool, said tool having a housing portion and a handle projecting therefrom, said apparatus comprising:

a holster for said tool, said holster including a tool storing portion comprised of an open ended receptacle for said housing with said handle engaging a portion of one of said open ends, an opening in one side of said receptacle exposing electrical contacts on said housing for recharging said tool, said holster further including clip means for detachably affixing said holster to the clothing of a user of the tool; and recharging means having a base disposed to detachably engage said holster, said base including contact means that electrically contact said electrical contacts on said housing through said opening in said receptacle.

5. An apparatus for storing and charging a rechargeable electric tool, said apparatus comprising:

a holster for said tool, said holster including a tool storing portion disposed to receive and retain the tool in said portion, a U-shaped clip affixed to one side of said tool storing portion and an opening in said tool storing portion that exposes electrical contacts on said rechargeable electric tool when said tool is within said tool storing portion; and recharging means having a base disposed to detachably engage said U-shaped clip of said holster, said base including contact means that electrically connect with said contacts on said electric tool through said opening in said tool storage portion.

6. The apparatus of claim 5 wherein said U-shaped clip and said opening in said tool storage portion are on the same side of said tool storage portion of said holster.

7. An apparatus for storing and charging a rechargeable electric drill, said drill having a motor containing housing, electrical contacts on said housing for recharging said drill and a handle projecting from said housing, said apparatus comprising:

a holster for said drill, said holster having a portion disposed to receive and retain the housing of said drill, said portion of said holster including an opening therein for exposing said contacts on said housing, said holster further including means for detachably affixing said holster to the clothing of a user of the drill; and recharging means having a base disposed to detachably engage said holster, said base including means for electrically contacting said electrical contacts on said housing through said opening in said portion of said holster.

8. The apparatus of claim 7 wherein said holster means includes means for storing drill bits.

9. The apparatus of claim 7 wherein said bit storage means is detachably affixed to said holster.

10. The apparatus of claim 9 wherein said bit storage means is an elastomeric member for receiving said bits, said elastomeric member being disposed to fit in an opening in said holster.

11. An apparatus for storing and charging a rechargeable electric drill, said drill having a motor-containing housing, electrical contacts on said housing for recharging said drill and a handle projecting from said housing, said apparatus comprising:

a holster for said drill, said holster having a housing-receiving portion disposed to fit around said housing, said housing-receiving portion including means for detachably fixing the housing to the clothing of the user, an opening in said housing-receiving portion, said opening being on the same side as said affixing means, said opening exposing said contacts on said housing; and means for recharging said drill comprising a base disposed to detachably engage said holster and said affixing means, means for electrically contacting said electrical contacts on said housing through said opening in said housing-receiving portion of said holster and means cooperating through said opening for securing said drill relative to said base.

12. An apparatus for storing and charging a rechargeable battery-operated tool, said apparatus comprising:

a holster for removably storing said tool therein;
means for recharging said tool stored in said holster; and
means for detachably affixing said holster to the clothing of a user of the tool and for detachably engaging and supporting said holster, with said tool stored therein, on said recharging means.

13. The apparatus of claim 12 also including means for detachably affixing said tool while in said holster to said recharging means.

14. An apparatus for storing and charging a rechargeable battery-operated tool, said apparatus comprising:

a holster for removably storing said tool therein;
means for detachably affixing said holster to the clothing of a user of the tool; and
means for detachably engaging and supporting said holster and for recharging said tool stored in said holster.

15. A method for storing and charging a rechargeable battery-operated tool comprising the steps of:

(a) removably storing the tool in a holster;
(b) detachably affixing the holster, with the tool stored therein, to the clothing of a user for intermittent sotrage while the tool is being used; and
(c) removing the holster, with the tool stored therein, from the clothing of the user and detachably engaging the holster with the tool stored therein on a recharging means for recharging the batteries of the tool.

16. The method of claim 15 wherein step (b) includes hooking a clip on the holster over a belt of the user.

17. The method of claim 16 wherein step (c) includes hooking said clip over a projection on a base of said recharging means.

18. The method of claim 15 wherein step (c) includes hooking a clip on the holster over a projection on a base of the recharging means.

19. The method of claim 15 further comprising the step aligning and electrically connecting a contact on the tool with a contact on the recharging means through an opening in the holster.

20. The method of claim 19 wherein said contacts are automatically aligned and electrically connected when said holster is detachably engaged with said recharging means.

21. The method of claim 20 further comprising the step of releasably fixing said tool to said recharging means when said holster is detachably engaged with said recharging means.

22. The method of claim 15 further comprising the steps of releasably affixing the tool to said recharging means.

23. The method of claim 15 wherein step (c) includes auomatically releasably affixing said tool to said recharging menas when said holster is detachably engaged with said recharging means.

24. The memthod of claim 15 further comprising the steps of:
    (d) electrically connecting a contact on the tool with a contact on the recharging means; and
    (e) releasably fixing the tool to the recharging means.

25. The method of claim 24, wherein steps (c), (d) and (e) are performed simultaneously.

26. The apparatus of claim 6 wherein said recharging means includes a post projecting from said base proximate said contact means to engage a recess in said tool through said opening in the tool storage portion.

27. The apparatus of claim 26 wherein said U-shaped clip is sufficiently flexible to permit engagement and disengagement of said post and recess in said tool with said tool in said holster.

28. An apparatus for storing and recharging a rechargeable battery-operated tool, said apparatus comprising:
    means for recharging said tool;
    a holster for removably storing said tool;
    means in said holster for effecting charging contact between said tool and said recharging means; and
    means for affixing said holster to the clothing of a user of said tool.

* * * * *